United States Patent [19]
Pladys

[11] 3,782,124
[45] Jan. 1, 1974

[54] LIQUID STORAGE TANK
[75] Inventor: Nestor Pladys, Dunkerque, France
[73] Assignees: Societe Anonyme dite: Societe Francaise Des Petroles B.P., Courbevoie; Societe Anonyme dite: Soletanche, Paris, both of France
[22] Filed: Oct. 13, 1972
[21] Appl. No.: 297,354

[30] Foreign Application Priority Data
Oct. 15, 1971 France .................... 7137193

[52] U.S. Cl. .................................................. 61/.5
[51] Int. Cl. .............................................. B65g 5/00
[58] Field of Search .................................. 61/.5, 1

[56] References Cited
UNITED STATES PATENTS
3,052,380  9/1962  Prins ........................ 61/.5 X
3,491,540  1/1970  Lennemann ................ 61/.5
3,504,496  4/1970  Hnot ......................... 61/.5
3,516,568  6/1970  Fish .......................... 61/.5 X
3,592,009  7/1971  Alkmaar et al. .......... 61/.5

Primary Examiner—Mervin Stein
Assistant Examiner—Philip C. Kannan
Attorney—George B. Finnegan, Jr. et al.

[57] ABSTRACT

A novel semi-buried liquid storage tank is disclosed which comprises a frustoconical base, having a central well and a separate annular basin for containment of a hydrostatic balancing liquid. A duct is provided to permit fluid flow between the annular basin and the storage area of the tank. The tank is built on a natural or artificial impermeable soil layer or bottom.

10 Claims, 5 Drawing Figures

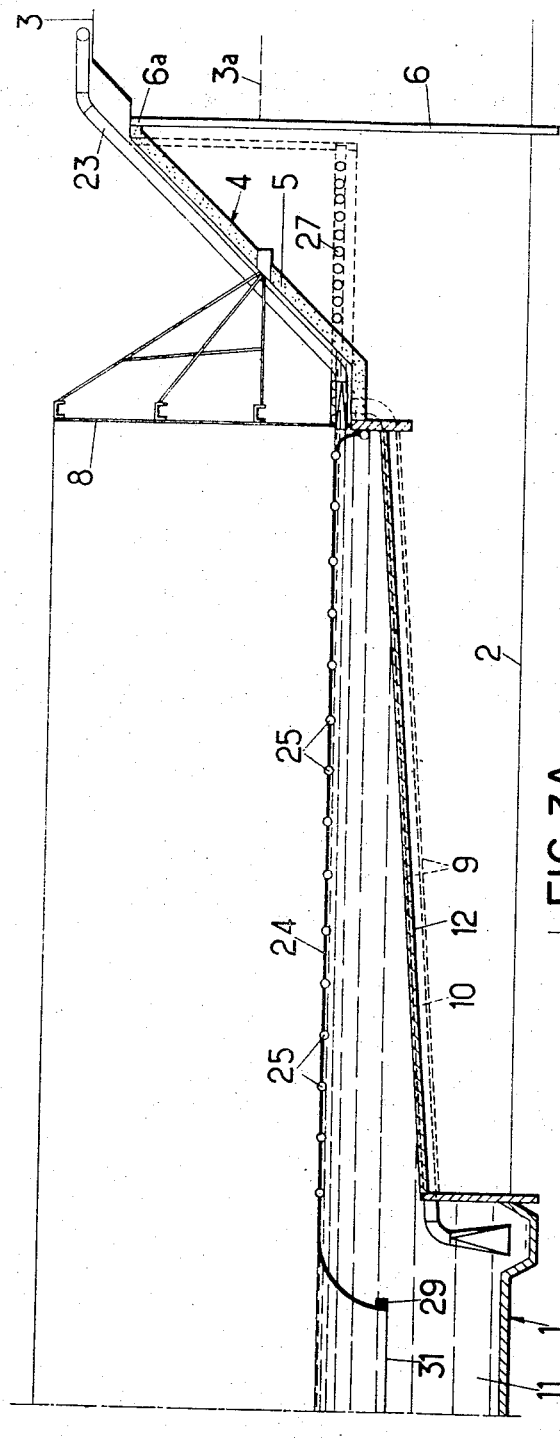
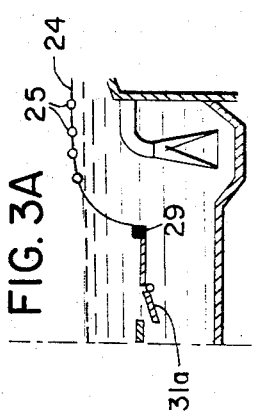
FIG.3
FIG.3A

LIQUID STORAGE TANK

This invention relates to the storage of liquids such as crude or refined petroleum products in semi-buried tanks the pressures on whose side walls are balanced hydrostatically.

The problems of storing crude or refined petroleum products and other similar volatile products are familar and of course the petroleum industry is investing progressively more heavily in storage tanks for such products.

Except for the special case of strategic tanks to which there must be no access, nowadays the majority of petroleum product storage tanks are formed by cylindrical tanks which are constructed above the natural soil level and can be 25–30 metres in height and 90 metres in diameter at most.

With these maximum dimensions, the largest capacity which can be readily reached is of the order of 150 000 m$^3$, and such capacity cannot be increased as required, due *inter alia* to inadequate strength of the sheet metal forming the tank bottom and the limited strength of the soil supporting such tank.

Moreover, the price of such tanks is very high, they take up a considerable amount of space and spoil the appearance of the area, and the risk of losses of petroleum product increase in proportion to the size of the tanks, whose retaining basins are not always strong enough.

Semi-buried petroleum products storage tanks are also known which are balanced by a water-filled annular basin enclosing the tank itself.

In these tanks of known kind, the water table cannot be situated above the tank bottom, because when the tank is empty the water table would exert on the outer edges of the annular basin a considerable pressure which would tear away its water-tight cladding, if any, or otherwise the water table would communicate with the water in the annular basin.

Tanks of this kind can operate only if the soil is impermeable or the water table at a level lower than that of the tank bottom.

Moreover, if the soil is permeable and the annular basin has no water-tight cladding, in the prior art tanks the water level in the basin cannot be regulated in dependence on the density of the stored petroleum product.

Lastly, refined petroleum products which must be separated bodily from the balancing water cannot be stored in prior art tanks.

The invention relates to a semi-buried type of tank which fully guarantees the insulation of the petroleum products from the atmosphere or surrounding water and also has the advantage of being inconspicuous and therefore not spoiling the appearance of the area.

In accordance with the invention, there is provided a semi-buried tank for the storage of liquid products such as petroleum products, in which the stressing of a side wall of the tank is balanced by the hydrostatic pressure of a balancing liquid, such as water, having a density higher than that of the product to be stored and immiscible therewith, which balancing liquid is displaced by the stored product during the filling of the tank into an annular basin enclosing the side wall, such tank including a central well whose bottom is at the level of a natural or artificial impermeable layer; a frustoconical base of slight inclination formed by a metal or concrete wall, such base being disposed above the said impermeable layer; a cylindrical or polygonal side wall formed by a metal or concrete partition whose lower portion is connected to the upper portion of the frustoconical base; an inclined bank forming an annular basin around the said side wall; a balancing duct connecting the annular basin to the central well; and an impermeable cylindrical wall which encloses the annular basin and extends in depth to said impermeable layer.

One of the main advantages of a petroleum product storage tank embodying the invention is that its walls are subjected to substantially reduced stressing; since the balancing duct readily produces a hydrostatic balance between the inside and outside of the enclosure containing the petroleum product, due to the immiscibility of the crude petroleum with the balancing liquid, i.e. water, which is contained in a central well and can rise into an annular basin surrounding the enclosure as the tank is filled.

The whole surface of semi-buried tanks must of course be completely isolated; this can be done only by using either a natural layer of impermeable rock at a level lower than that of the bottom of the tank to be constructed, or rendering such a layer at a depth of the order of 10–50 m in natural soil which has been rendered impermeable by known processes.

To form a completely impermeable basin insulating the tank, the impermeable bottom is completed by an impermeable vertical wall extending in depth to the impermeable geological layer and forming a cylindrical water-tight curtain insulating the annular basin from the surrounding soil, so that any water table adjacent the soil cannot exert a thrust on the basin.

A mere water-tight covering of the bottom of the basin would be unable to bear against the bank or stand up to the pressure of the water table when the tank was empty. The impermeable wall also insulates the balancing water from the water table, thus obviating losses during balancing.

Another advantage of the combination of the water-tight curtain with the water-filled annular space is that it ensures efficient protection against leakages and risks of pollution of the water table.

The methods of making a water-tight curtain of the kind specified are disclosed in France Patents No. 7022101 and 7037236 which are hereby incorporated by reference.

After the impermeable walls have been constructed, the soil contained between the walls and the impermeable geological layer is excavated, leaving behind banks having one or more slopes and protected by a filter which can be formed, for instance, by a ballast material such as crushed rock, broken concrete or the like for preventing the water which, as will be seen hereinafter, is in contact with the bank from eroding the same during the movements of the water which take place during changes in the degree of filling of the tank.

The result is a frustoconical excavation whose bottom is impermeable due to the presence of the aforementioned geological layer and whose walls are indirectly made impermeable by the presence of the aforementioned vertical walls.

Of course, if there is no impermeable geological layer at the required depth, one can be produced by injecting soil by known methods.

After this operation, a metal or concrete enclosure forming the actual tank is constructed.

The tank comprises a central wall surrounded by a frustoconical base of slight inclination and a cylindrical outer wall which can be closed by a floating roof.

The central wall is slightly buried in the impermeable geological layer which can be, for instance, clay, the well being adapted to form a large basin for draining away water accumulating in the well, the basin being connected via a balancing duct with the annular basin disposed between the cylindrical outer wall of the tank and the aforementioned banks.

The water level in the central well can be used for the remote control of a warning device indicating the completion of filling; alternatively, a warning device can be provided on the side of the annular basin into which the balancing ducting extends.

The peripheral skirt of the tank is preferably made of metal and can be cylindrical or polygonal in shape.

For the treatment of crude petroleum dregs, the balancing water coming from the annular basin can be delivered by a pump to a horizontally discharging circular overflow disposed at the junction of the tank base and the vertical wall. The slope of the tank base ensures that the water flows satisfactorily towards the central well.

The result is that the tank bottom is cleaned to avoid sediments of crude petroleum which might occur when the tank was full, but for the provision of this device.

The crude petroleum is supplied and renewed in known manner by a diffuser at a level just below the bottom position of the floating roof with which the tank may be provided in known manner.

The tank operates as follows: before the tank is filled with crude petroleum, it contains a predetermined amount of water on whose surface the tank roof floats. When the crude petroleum is supplied, the roof rises and the water level goes down in the tank, the excess water flowing through the balancing duct into the outside annular basin, whose level rises.

During tank filling, the outside level of the water in the annular basin and the level of the crude petroleum in the tank rise simultaneously, but the difference in density between the water and the petroleum product limits the height of the water to a level lower than that of the petroleum product when the tank is full.

The pressures exerted on either side by the water and the petroleum on the tank vertical wall increase progressively linearly in dependence on the difference in level between the free surface of the crude petroleum and that of the water in the annular tank.

In contrast, over the lower portion of the vertical wall the pressures decrease progressively from the surface of the outside water in the direction of the bttom of the central well and are cancelled out completely at the water-petroleum interface.

So that petroleum products of different density can be stored, a tank embodying the invention may also have a device enabling the body of water contained in the annular basin to be varied as required by the scaveging system used to obviate crude petroleum dregs.

In one embodiment of the invention two floating barriers are disposed on the surface of the annular basin to isolate the zone containing the balancing ducting inlet. The petroleum product is therefore prevented from spreading accidentally over the whole surface of the annular basin if, for instance, the warning device indicating completion of filling fails to operate. For the same reasons the petroleum product inlet ducting is preferably disposed between the two barriers.

When a tank embodying the invention is to be used for the storage of refined petroleum products or other volatile products, the tank may be provided with a plastic screen or separator having floats, to prevent the water in the central well from mixing with the petroleum in the tank. The plastic screen may be made of Hypalon, p, c, v, or any synthetic rubber.

The plastic screen or separator has a central cutaway portion or a floating valve enabling residual water in the petroleum product to be drained off and rainwater to be evacuated to the central well.

In order that the invention may be readily understood, embodiments thereof will now be described in more detail, by way of example, with reference to the accompanying drawings, wherein FIG. 1 is a radial half section, in elevation, of a semi-buried crude petroleum storage reservoir having a capacity of 350 000 m³;

FIG. 3 is a radial half section, in elevation, corresponding to FIG. 2, in which the plastic screen is shown in the top position which it occupies when the tank is empty, and FIG. 3A shows a modification of the tank shown in FIG. 3 wherein the circular cutaway portion is replaced with a floating valve;

Figure 1:
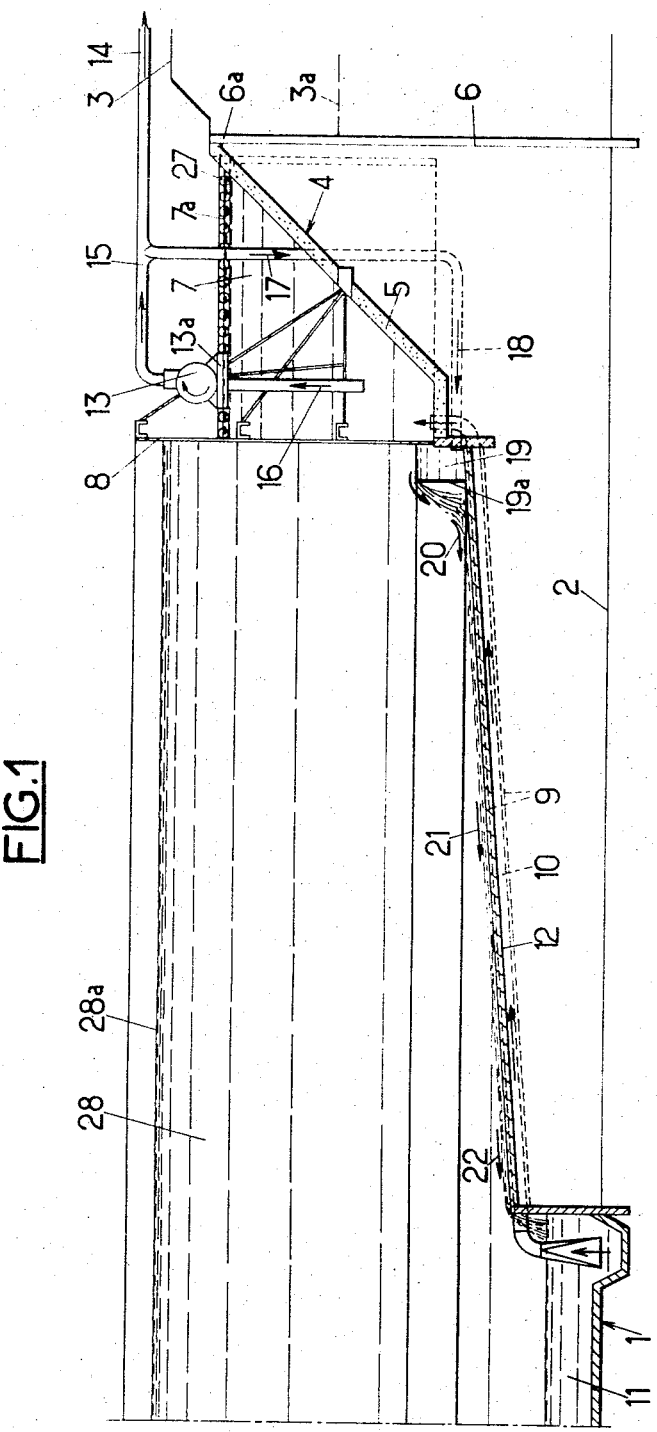

Referring to FIG. 1, a central well 1 of the storage tank is buried at a shallow depth below the level 2 of an impermeable layer which is natural or produced by conventional processes at a depth of 10–50 m in the natural soil in which the tank is partly buried.

The natural soil 3 is excavated in a frustoconical bank 4 covered with a layer of filtering ballast 5, a water-tight screen 6 enabling water 7 disposed between the ballast 5 and tank vertical wall 8 to be isolated satisfactorily from the watertable 3a in the surrounding soil.

The thickness of the screen 6 must be selected in dependence on the pressure exerted by the watertable when the level of the water 7 in the annular basin is rather low in relation to the level of the watertable, which must itself be lower than the level of the upper portion 6a of the wall 6.

Chain lines are used to show walls 9 of balancing duct 10 enabling the water 11 in the central well to flow into the annular basin 7 and raise its level.

When the tank is empty, the water 11 in its central well is at the same level as the water in the bottom of the annular basin.

When the tank is filled with crude petroleum 28 by means which are not shown, water is driven from central well 1 to basin 7, the free water surface 7a remaining constantly at a level lower than that of the free surface 28a of the crude petroleum disposed between the cylindrical or polygonal wall 8, frustoconical base 12 and the interface with the water contained in the central well 1.

In FIG. 1 the difference in level is at its greatest, the tank being shown full, and the amount of water used varying in dependence on the density of the crude petroleum stored in the tank, since if the crude petroleum is light, the amount of water required will be less than that for a relatively heavy crude petroleum.

A motor and pump unit 13 enables any excess water to be evacuated via a header 14 and any extra water to be supplied via the header 14. The unit 13 can be mounted, for instance, floating on a raft 13a and connected to a fixed header 14 via articulated ducting 15, 16.

The pump 13 als enables the frustoconical base 12 of the tank to be cleaned by supplying water in the direction illustrated by arrows 17 and 18 to an overflow 19 formed by a vertical wall 19a parallel to the tank side wall 8, such water flowing along the upper wall of the frustoconical base 12, as indicated by arrows 20 to 22, and therefore cleaning such upper wall of the frustoconical base 12 and preventing sediments from being deposited thereon. The flowing water also ensures that the sediments are slowly brought back into suspension in the movement of the fluid.

Figure 2:
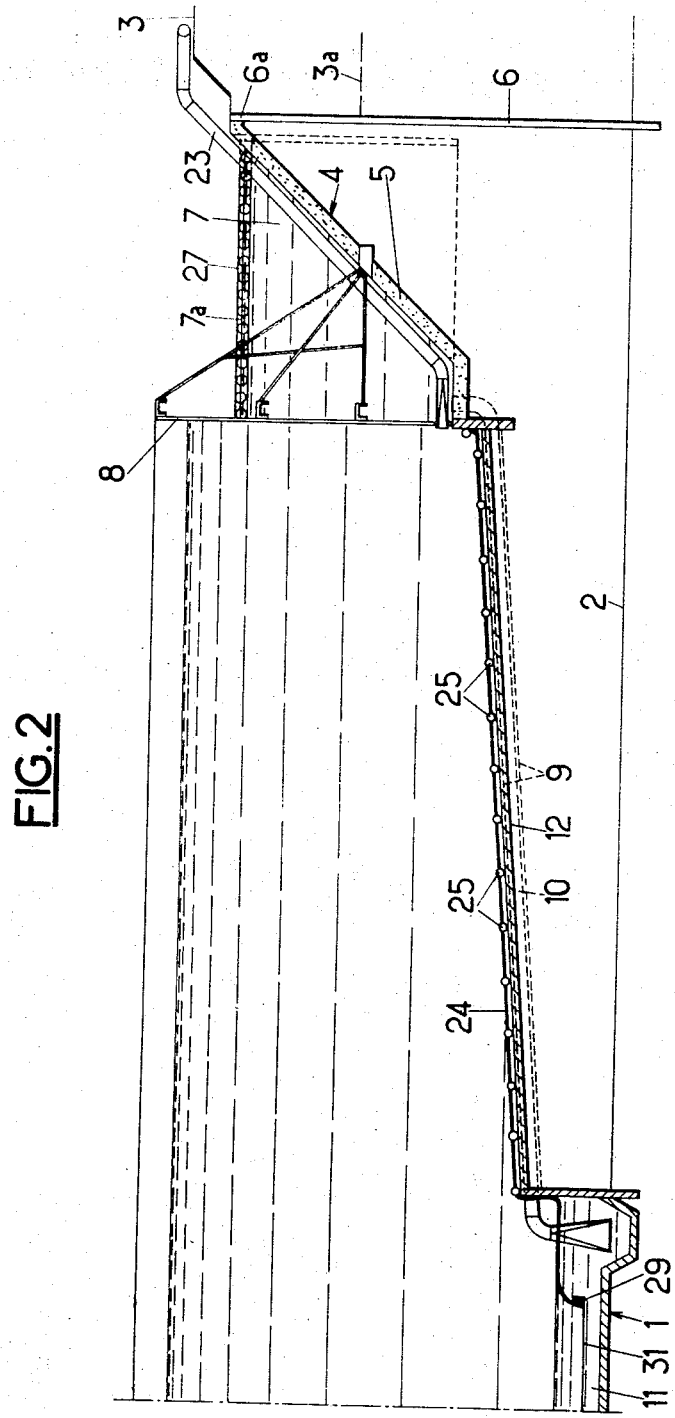
FIG. 2 is a half section, in elevation, of a semi-buried storage tank for refined products or other volatile products, the tank comprising a plastic screen (shown in its bottom position) for insulating the refined product.
Figure 4:
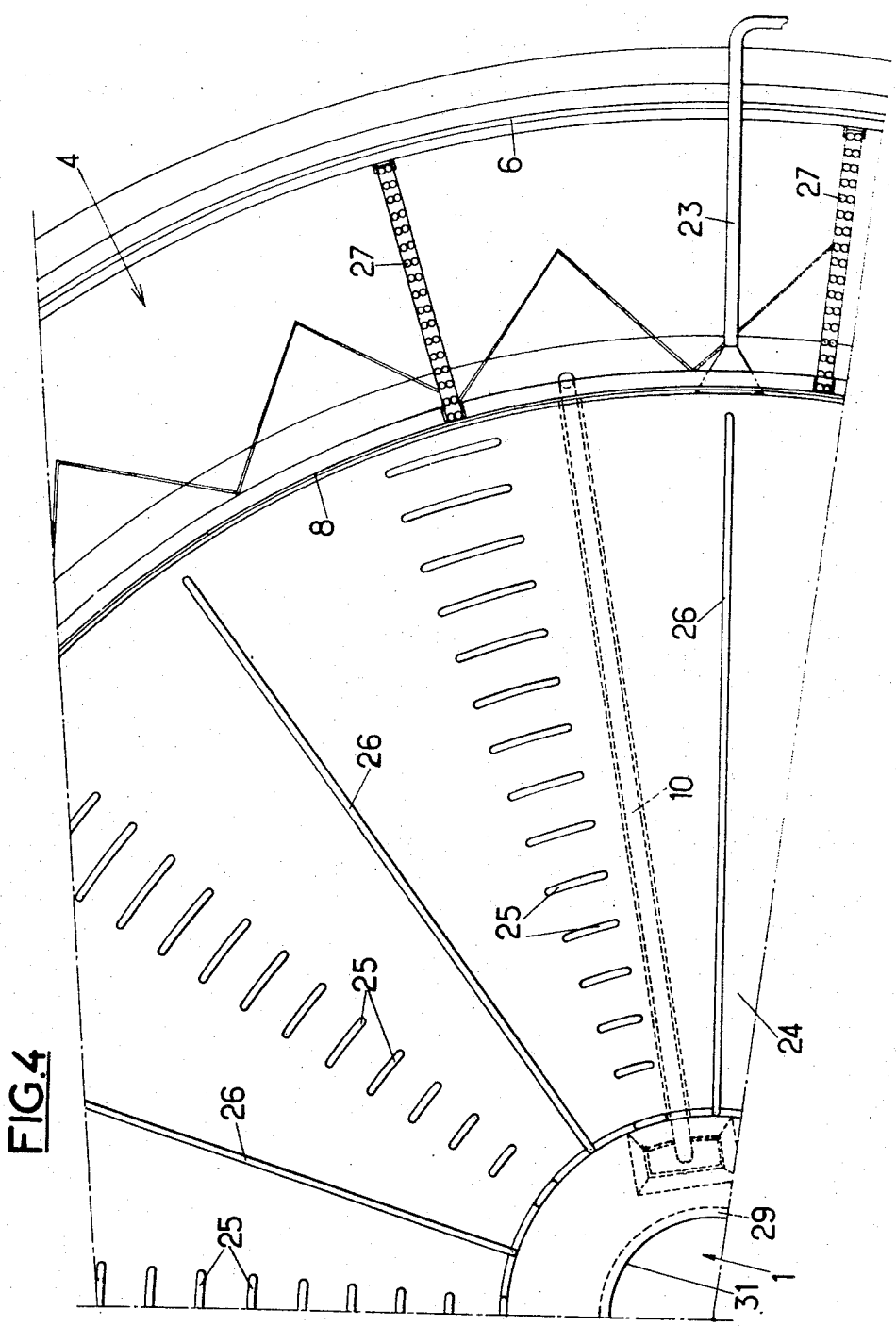
FIG. 4 is a partial plan view of the tank illustrated in FIGS. 2 and 3, showing details of the floats disposed on the insulating plastic screen to ensure that the screen floats on the free surface of the water below the refined product.

FIGS. 2 to 4 illustrate another embodiment of the tank according to the invention which is more particularly adapted to the storage of refined products.

FIGS. 2 to 4 show a balancing duct 10, the refined petroleum being supplied via a duct 23 above a plastic screen 24 whose central portion has floats 25 and sinkers 29. The centre of the plastic screen 24 is formed by a circular cutaway portion 31 adapted to collect rainwater from a floating roof (not shown) and drain away the residual water which even refined petroleum always contains.

At this central portion of screen 24, therefore, limited physical contact is allowed between the water and the petroleum product. However, such contact could be eliminated by substituting for the cutaway portion 31 a floating valve 31a adapted to allow water to flow only in the direction into the central well.

Like FIG. 1, FIG. 2 shows the petroleum tank in the filled condition so that the plastic screen 24 insulates the tank base 12 from a refined product 30 disposed above the screen 24.

As shown in FIG. 3, the tank only contains water on whose surface the plastic screen 24 floats, descending progressively as the tank is filled, until the screen reaches the bottom position shown in FIG. 2.

FIG. 4 also shows the duct 23 and the plastic sheet 24 having floats 25, other radial floats being shown at 26.

FIG. 4 also shows the balancing ducting 10 (in chain lines) and two insulating barriers 27 which enclose the duct 23. The barriers 27 are mounted on floats and guided along the tank side wall 8 and by a groove 32 formed in the bank 4. The two barriers 27 are adapted to prevent the petroleum product from spreading over the whole surface of the annular basin if the duct 23 should leak or if the petroleum product should flow up the balancing ducting 10 due to accidental overfilling of the tank.

One of the advantages of these tanks embodying the invention is that they are always pressurized and never under negative pressure, even when the tank is empty, since in that case the tank contains the balancing water.

Calculations of the maximum pressures which the tank vertical wall must withstand show that on an average they are five times less than in the case of storage in conventional tanks.

Consequently, steel which is five times thinner than that required for a conventional tank can be used for the portion withstanding the heavy pressures, and even as little as one-eighth of the thickness can be used in the lower portion of the tank.

The pressures withstood by the tank bottom are also substantially reduced, certainly requiring a thickness only one-third of that needed for conventional tanks.

These savings mean that very high capacity tanks can be constructed which occupy a much smaller area and can be more readily assembled, due to the greater facility with which thinner sheets of metal can be welded to one another.

The saving in cost price achieved by the adoption of tanks according to the invention may be put at about 65 percent that of a conventional tank of identical capacity.

The water in the annular basin also forms a very advantageous fire fighting reservoir.

Advantageously, tanks of the kind specified are equipped wijh lightweight-frame floating roofs which can readily be adapted to such large diameters.

Of course, although the invention has been described as applied to petroleum products, it is not limited thereto and could perfectly well be used for the storage of other liquid products.

If the water to be stored is always of higher density than water, the balancing liquid can have a density higher than water on condition that such liquid is immiscible with the product to be stored.

I claim:

1. A semi-buried tank for the storage of liquids, said tank having a cylindrical side wall in which the stressing of said side wall of said tank is balanced by the hydrostatic pressure of a balancing liquid having a density higher than that of the stored liquid and immiscible therewith, said balancing liquid is displaced by the stored liquid, during the filling of the tank, into an annular basin enclosing said side wall, said tank including a central well having an impermeable bottom; a slightly inclined frustoconical base connected at its inner end to the wall of said central well and extending upwardly and outwardly from said central well, said base being disposed above said impermeable bottom; said cylindrical side wall of said tank being connected at its lower end to the outer end of said frustoconical base; and inclined bank forming an annular basin around said tank side wall; a balancing duct connecting said annular basin to said central well; and an impermeable cylindrical wall surrounding said annular basin and extending in depth to the depth of said impermeable bottom.

2. A storage tank according to claim 1, wherein the surface of the inclined bank is covered with a filter to prevent the bank from being eroded by the balancing liquid.

3. A storage tank according to claim 1, including a pumping system for varying the total volume of the balancing liquid in relation to the density of the stored product, such system comprising a pump whose intake and delivery are connected to the annular basin.

4. A storage tank according to claim 1, including an annular horizontal overflow disposed along the lower inner periphery of the tank side wall and means for pumping balancing liquid thereto, said annular horizotal overflow being arranged so that the overflowing balancing liquid flows over the inclined surface of the frustoconical base in the direction of the central well to prevent the formation of sediment on the base.

5. A storage tank according to claim 1, for the storage of liquid products of different density, which must be separated bodily from the balancing liquid, said tank including a flexible isolating screen whose periphery is attached in sealing-tight relationship to the lower portion of the tank side wall, the inlet and pumping ducts of the stored product extending into the tank above the flexible screen whose center has a cutaway portion.

6. A tank according to claim 5, wherein the central portion of the flexible screen has a valve to allow water to flow to the central well.

7. A storage tank according to claim 5, wherein the flexible screen includes flotation means and its central portion has sinking means.

8. A storage tank according to claim 1, including two insulating barriers so mounted on floats between the tank side wall and the inclined bank as to enclose that portion of the surface of the annular basin which comprises the inlet of the balancing duct.

9. A storage tank according to claim 8, wherein the inlet and pumping ducts extend through that portion of the annular basin which is enclosed by the two insulating barriers.

10. A semi-buried tank for the storage of liquids, said tank having a polygonal side wall in which the stressing of said side wall of said tank is balanced by the hydrostatic pressure of a balancing liquid having a density higher than that of the stored liquid and immiscible therewith, said balancing liquid is displaced by the stored liquid, during the filling of the tank, into an annular basin enclosing said side wall, said tank including a central well having an impermeable bottom; a slightly inclined frustoconical base connected at its inner end to the wall of said central well and extending upwardly and outwardly from said central well, said base being disposed above said impermeable bottom; said polygonal side wall of said tank being connected at its lower end to the outer end of said frustoconical base; and inclined bank forming an annular basin around said tank side wall; a balancing duct connecting said annular basin to said central well; and an impermeable cylindrical wall surrounding said annular basin and extending in depth to the depth of said impermeable bottom.

* * * * *